United States Patent
Lloyd et al.

(10) Patent No.: US 9,933,772 B2
(45) Date of Patent: Apr. 3, 2018

(54) ANALYZING SCADA SYSTEMS

(71) Applicant: SCHNEIDER ELECTRIC USA, INC., Palatine, IL (US)

(72) Inventors: Chad Andrew Lloyd, Old Hickory, TN (US); Jayme Lee McQuillan, Murfreesboro, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 203 days.

(21) Appl. No.: 14/764,353

(22) PCT Filed: Mar. 31, 2013

(86) PCT No.: PCT/US2013/034746
§ 371 (c)(1),
(2) Date: Jul. 29, 2015

(87) PCT Pub. No.: WO2014/163606
PCT Pub. Date: Oct. 9, 2014

(65) Prior Publication Data
US 2015/0370235 A1     Dec. 24, 2015

(51) Int. Cl.
*G05B 19/048* (2006.01)
*G06F 9/445* (2018.01)
*G06F 9/44* (2018.01)

(52) U.S. Cl.
CPC .............. *G05B 19/048* (2013.01); *G06F 8/64* (2013.01); *G05B 2219/24048* (2013.01); *G06F 8/60* (2013.01); *G06F 8/70* (2013.01)

(58) Field of Classification Search
CPC ........ G05B 19/048; G05B 2219/24048; G06F 8/64; G06F 8/70; G06F 8/60
See application file for complete search history.

(56) References Cited

U.S. PATENT DOCUMENTS

| 4,924,434 A | 5/1990 | Christenson et al. |
| 7,418,733 B2 | 8/2008 | Connary et al. |

(Continued)

FOREIGN PATENT DOCUMENTS

WO     20090128905 A1    10/2009

OTHER PUBLICATIONS

Extended European Search Report from corresponding European Application No. 13881387.8 dated Oct. 11, 2016.

(Continued)

*Primary Examiner* — Charles Kasenge
(74) *Attorney, Agent, or Firm* — Lando & Anastasi, LLP (57) ABSTRACT

A method for analyzing SCADA projects includes generating a configuration for the SCADA system deployed in a default environment, receiving a first result of a set of tests run on the SCADA system using the configuration in the default environment, determining whether the first result of the set of tests is successful, deploying the SCADA system using the configuration in a customer environment, comparing the default environment with the customer environment, determining differences between the default environment and the customer environment, receiving a result of another set of tests run based on the differences between the default environment and the customer environment, adjusting the configuration in the customer environment based on the result of the another set of tests to generate an adjusted configuration, and receiving a second result of the set of tests run on the SCADA system using the adjusted configuration in the customer environment.

19 Claims, 5 Drawing Sheets

(56) References Cited

U.S. PATENT DOCUMENTS

| | | | |
|---|---|---|---|
| 8,055,738 B2 | 11/2011 | Shah et al. | |
| 8,060,259 B2 | 11/2011 | Budhraja et al. | |
| 8,244,499 B2 | 8/2012 | Lambie et al. | |
| 8,255,186 B2 | 8/2012 | Mukhi et al. | |
| 8,276,089 B1 | 9/2012 | Jaramillo et al. | |
| 8,356,353 B2 * | 1/2013 | Futoransky | H04L 63/1433 726/23 |
| 8,909,926 B2 * | 12/2014 | Brandt | H04L 63/1408 709/205 |
| 9,026,394 B2 * | 5/2015 | Kube | G05B 23/0256 324/759.01 |
| 9,412,073 B2 * | 8/2016 | Brandt | H04L 63/1408 |
| 2004/0073662 A1 * | 4/2004 | Falkenthros | H04L 41/5064 709/224 |
| 2004/0260404 A1 | 12/2004 | Russell et al. | |
| 2009/0007270 A1 * | 1/2009 | Futoransky | H04L 63/1433 726/25 |
| 2011/0009984 A1 | 1/2011 | Mukhi et al. | |
| 2011/0039237 A1 | 2/2011 | Skare | |
| 2011/0106317 A1 | 5/2011 | Kram et al. | |
| 2012/0173931 A1 | 7/2012 | Kube et al. | |
| 2012/0324353 A1 | 12/2012 | Torbey et al. | |
| 2013/0031037 A1 | 1/2013 | Brandt et al. | |
| 2013/0031340 A1 | 1/2013 | Carrara et al. | |
| 2015/0365303 A1 | 12/2015 | Lloyd | |

OTHER PUBLICATIONS

International Search Report and Written Opinion from corresponding PCT Application Serial No. PCT/US2013/034746, dated Aug. 2, 2013.

* cited by examiner

ANALYZING SCADA SYSTEMS

RELATED APPLICATION

This application is a U.S. National Stage Application under 35 U.S.C. § 371 of International Application No. PCT/US2013/034746, filed Mar. 31, 2013, which is hereby incorporated herein by reference in its entirety.

BACKGROUND

Field of Invention

At least some embodiments disclosed herein relate to systems and methods for analyzing supervisory control and data acquisition (SCADA) systems.

Discussion of Related Art

Supervisory control and data acquisition (SCADA) systems are computer controlled systems that monitor and control large-scale processes. Such processes can include industrial processes, such as manufacturing, production, power generation, and fabrication. Industrial processes can also include infrastructure processes such as water treatment, electrical power transmission and distribution, and communication systems. Industrial processes can also include facility processes, such as heating, ventilation, and air conditioning (HVAC) systems, and energy consumption. SCADA systems can be customized based on various factors, such as type of processes, location, and scale.

SUMMARY

At least one aspect disclosed herein is directed to a SCADA project analysis system. A method for analyzing SCADA projects includes generating a configuration for the SCADA system deployed in a default environment, receiving a first result of a set of tests run on the SCADA system using the configuration in the default environment, determining whether the first result of the set of tests is successful, deploying the SCADA system using the configuration in a customer environment, comparing the default environment with the customer environment, determining differences between the default environment and the customer environment, receiving a result of another set of tests run based on the differences between the default environment and the customer environment, adjusting the configuration in the customer environment based on the result of the another set of tests to generate an adjusted configuration, and receiving a second result of the set of tests run on the SCADA system using the adjusted configuration in the customer environment.

In some embodiments, deploying the SCADA system using the configuration in a customer environment is based on a determination that the first result of the set of tests is successful.

In some embodiments, the method further includes based on a determination that the first result of the set of tests is unsuccessful, modifying the configuration for the SCADA system deployed in the default environment, and receiving another result of the set of tests run on the SCADA system using the modified configuration in the default environment.

In some embodiments, the method further includes receiving another result of the another set of tests run based on the adjusted configuration and the differences between the default environment and the customer environment.

In some embodiments, the method further includes based on the result of the another set of tests, providing a recommended change to the customer environment.

In some embodiments, the method further includes monitoring the customer environment for changes to the customer environment, and detecting at least one change in the customer environment. In some embodiments, the method includes receiving a third result of the set of tests run on the SCADA system using the adjusted configuration and the at least one change in the customer environment.

In some embodiments, receiving the results of the set of tests includes receiving results of penetration tests on the security vulnerability of the SCADA system.

In some embodiments, generating a configuration for the SCADA system includes generating a document detailing values of settings for each of the devices in the SCADA system.

Aspects also include a system for analyzing a SCADA project. The system includes a processor configured to generate a configuration for the SCADA system deployed in a default environment, receive a first result of a set of tests run on the SCADA system using the configuration in the default environment, determine whether the first result of the set of tests is successful, deploy the SCADA system using the configuration in a customer environment, compare the default environment with the customer environment, determine differences between the default environment and the customer environment, receive a result of another set of tests run based on the differences between the default environment and the customer environment, adjust the configuration in the customer environment based on the result of the another set of tests to generate an adjusted configuration, and receive a second result of the set of tests run on the SCADA system using the adjusted configuration in the customer environment.

Aspects also include a non-transitory computer readable medium having stored thereon sequences of instruction for generating a configuration for the SCADA system deployed in a default environment, receiving a first result of a set of tests run on the SCADA system using the configuration in the default environment, determining whether the first result of the set of tests is successful, deploying the SCADA system using the configuration in a customer environment, comparing the default environment with the customer environment, determining differences between the default environment and the customer environment, receiving a result of another set of tests run based on the differences between the default environment and the customer environment, adjusting the configuration in the customer environment based on the result of the another set of tests to generate an adjusted configuration, and receiving a second result of the set of tests run on the SCADA system using the adjusted configuration in the customer environment.

Still other aspects, examples, and advantages of these exemplary aspects and examples are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

In at least some aspects and embodiments disclosed herein, a system is provided that can allow a user to analyze a SCADA system. In some embodiments, the SCADA system can be analyzed for security issues. For example, a configuration for the SCADA system can be implemented in a default environment and the security vulnerability of the configuration can be tested. The configuration can also be tested for performance and errors. The SCADA system can also be validated for full functional compatibility of devices on the system. A document can be generated outlining the details of the configuration and the environment. The configuration can receive a security certification (e.g., from a third party). Once the SCADA system is deployed in a customer environment, the customer environment can be compared to a default environment for differences. The differences in the environments can provide a basis for specific further testing of the configuration and the SCADA system. The configuration can be adjusted based on the further testing, and the adjusted configuration of the SCADA system can be tested again to receive security certification in the customer environment.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
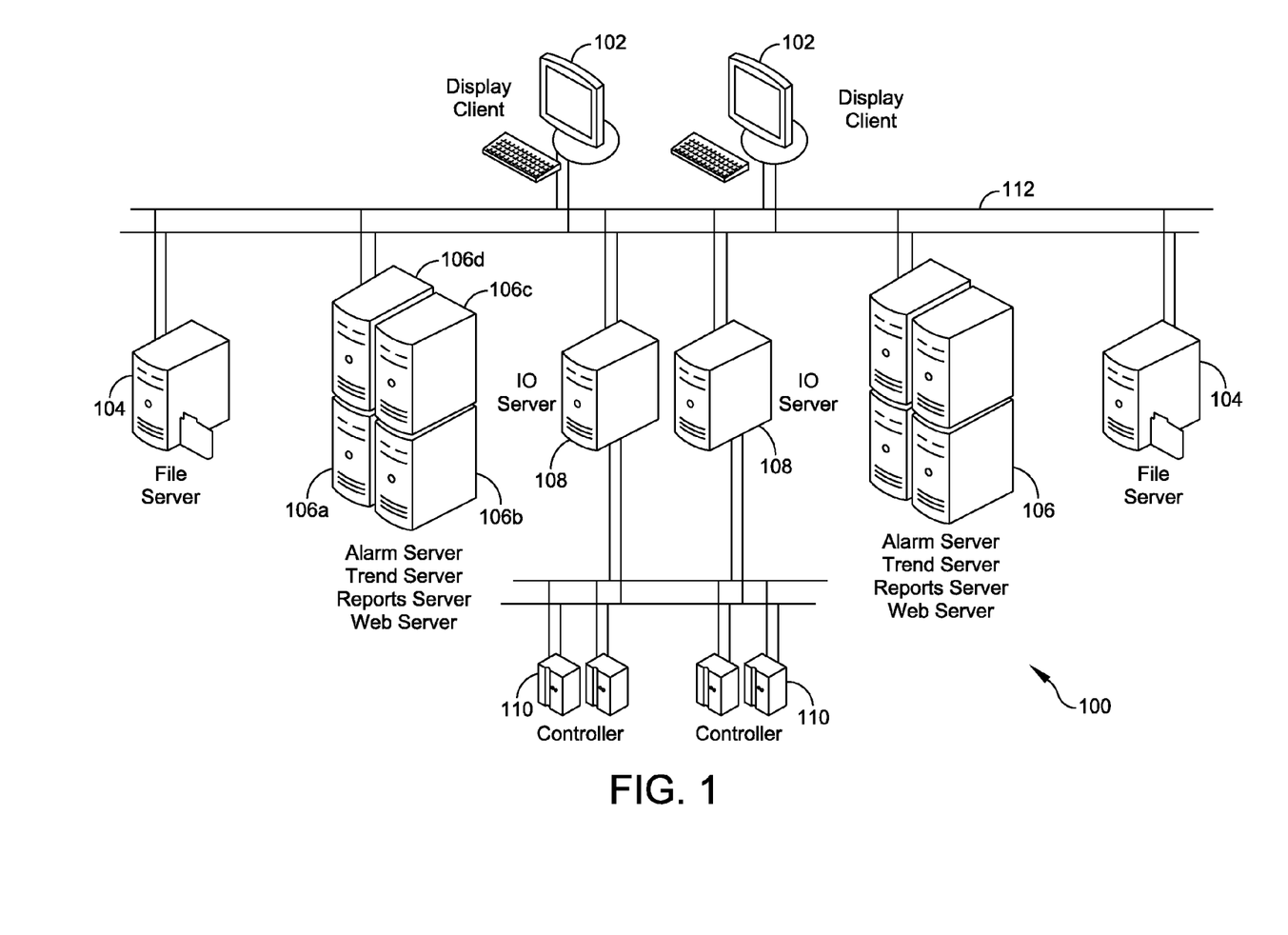
FIG. 1 is a block diagram of an example SCADA system according to aspects of some embodiments.

FIG. 1 shows an example SCADA system 100. In some embodiments, the SCADA system 100 includes one or more display clients 102, which can provide an interface for users to the SCADA system 100. The SCADA system 100 also includes one or more servers 104, 106, 108, which can include file servers, alarm servers, trend servers, report servers, web servers, and/or input/output (IO) servers. The SCADA system 100 also includes one or more controllers 110, which can monitor and provide instructions to devices, such as industrial process equipment. The display clients 102, servers 104, 106, 108, and the controllers 110 can be connected by a network 112. In some embodiments, the network 112 can include physical busses, an intranet, a local area network (LAN), a wide area network (WAN), wired and/or wireless connections (e.g., radio, satellite), and/or the Internet.

In some embodiments, the display clients 102 include a computing device, such as a computer, laptop, tablet computer, smartphone, mobile computing device, or other appropriate device including a processor. A user can use the display clients 102 to control and/or monitor the SCADA system and the industrial process monitored and controlled by the SCADA system. For example, the display clients 102 can include a client application that allows a user to provide commands to and receive data from the SCADA system. The client application can include various settings, for example, allowing a subset of users to provide commands and a subset of users to only monitor the SCADA system and the industrial process. In some embodiments, the display client 102 provides a web interface to the user, with the application running on a server separate from the display client 102, such as a web server 106. The application running on the web server 106 can provide an interface to the SCADA system similar to that of the client application, for example, including similar security settings.

In some embodiments, the servers include one or more file servers 104. The file servers 104 can include one or more databases to store data collected from the industrial process. For example, the file servers 104 can include a tag database, including data elements called tags. Tags can represent one or more input or output values monitored or controlled by the system, such as physical characteristics of the industrial process.

In some embodiments, the servers can also include one or more alarm servers 106a. The alarm servers 106a can process alarms received from controllers 110 or other components of the SCADA system 100. The alarm server 106a can also present the alarms to the display clients 102. For example, the SCADA system 100 can monitor whether predetermined alarm conditions are satisfied, to determine when an alarm event has occurred. If an alarm event is been detected, one or more actions can be taken (such as the activation of one or more alarm indicators, and/or the generation of email or other messages). In some embodiments, alarm indicators can remain active until the alarm is acknowledged by a user and/or the alarm conditions are cleared. Alarm conditions can include, for example, values of tags meeting a predetermine threshold. In some embodiments, alarms can be aggregated or otherwise processed prior to being presented to the user. For example, an alarm condition can initiate several other alarm conditions, resulting in a cascade of alarms. The alarms can be aggregated and presented as one alarm with an indication of the various alarm conditions associated with the alarm.

In some embodiments, the servers can also include one or more trend servers 106*b*. The trend servers 106*b* can analyze data to determine trends and present the trends to the display clients 102. For example, the trend servers 106*b* can analyze the data stored in the file servers 104 to determine patterns that can be used to adjust the system, for example, for greater performance and/or efficiency. For example, the trend servers 106*b* can determine that the monitored industrial process uses more power or less power at certain times of the day or in a regular pattern. The SCADA system 100 can use such a pattern to provide more or less power as appropriate, such as shutting down unused generators, to increase efficiency.

In some embodiments, the servers can also include one or more report servers 106*c*, which can generate reports to provide to the display clients 102. Reports can include information generated by the alarm servers 106*a* and trend servers 106*b*, as well as data from the file servers 104. The reports can be customized by the user to include information of interest to the user. The reports can be generated at a periodic interval, such as each day or other time, and/or on request by the user.

In some embodiments, the servers can also include one or more web servers 106*d*, which can generate and provide web pages for the display clients 102. The web servers 106*d* can run web applications that interface with the other servers and components of the SCADA system 100 to provide information to the display clients 102 and receive commands from the web clients 102 for the components.

In some embodiments, the servers can also include one or more IO servers 108. The IO servers 108 can receive data from devices, as well as alarm conditions. The IO servers 108 can also receive commands for the devices. The IO servers 108 can route the data and commands to appropriate destinations. In some embodiments, the IO servers 108 work as an interface between the display clients 102, the other servers, and the controllers 110.

In some embodiments, the SCADA system 100 also includes one or more controllers 110. The controllers 110 can include remote terminal units (RTUs), which can include and/or be connected to sensors in the industrial process. The sensors can monitor characteristics and parameters of the industrial process and provide sensor signals to the remote terminal units. The remote terminal units can convert the sensor signals into digital data and provide the information to the IO servers 108. The RTUs can also provide instructions to equipment in the industrial process. The controllers 110 can also include programmable logic controllers (PLCs), which can also receive information from sensors and provide instructions to equipment.

Each of the components of the SCADA system 100 can have settings which can be configured. For example, each of the servers 104, 106, 108 and display clients 102 can have operating systems configurations, such as firewall rules, running processes, file and process permission settings, and access control lists. While each of the servers in FIG. 1 is shown as a separate computing device, the functionality of the servers can be consolidated into fewer computing devices or further distributed among more computing devices. The servers can also include anti-virus and/or anti-malware applications. The types and number of controllers 110, sensors, equipment, servers, display clients 102, included in the SCADA system 100 can also be a configurable setting. The configuration can also include historical logging configurations and external network device configurations (e.g., switches, routers, firewalls, additional devices connected to the network 112). The configuration can also include applications and versions of the applications running on the display clients 102 and servers 104, 106, 108. In some embodiments, the configuration includes a value for some or all of the settings that can be changed on some or all of the devices included in the SCADA system 100. In some embodiments, an environment includes hardware and operating systems, including the number and types of the devices as well as other connected devices such as firewalls, routers, and switches.

Figure 2:
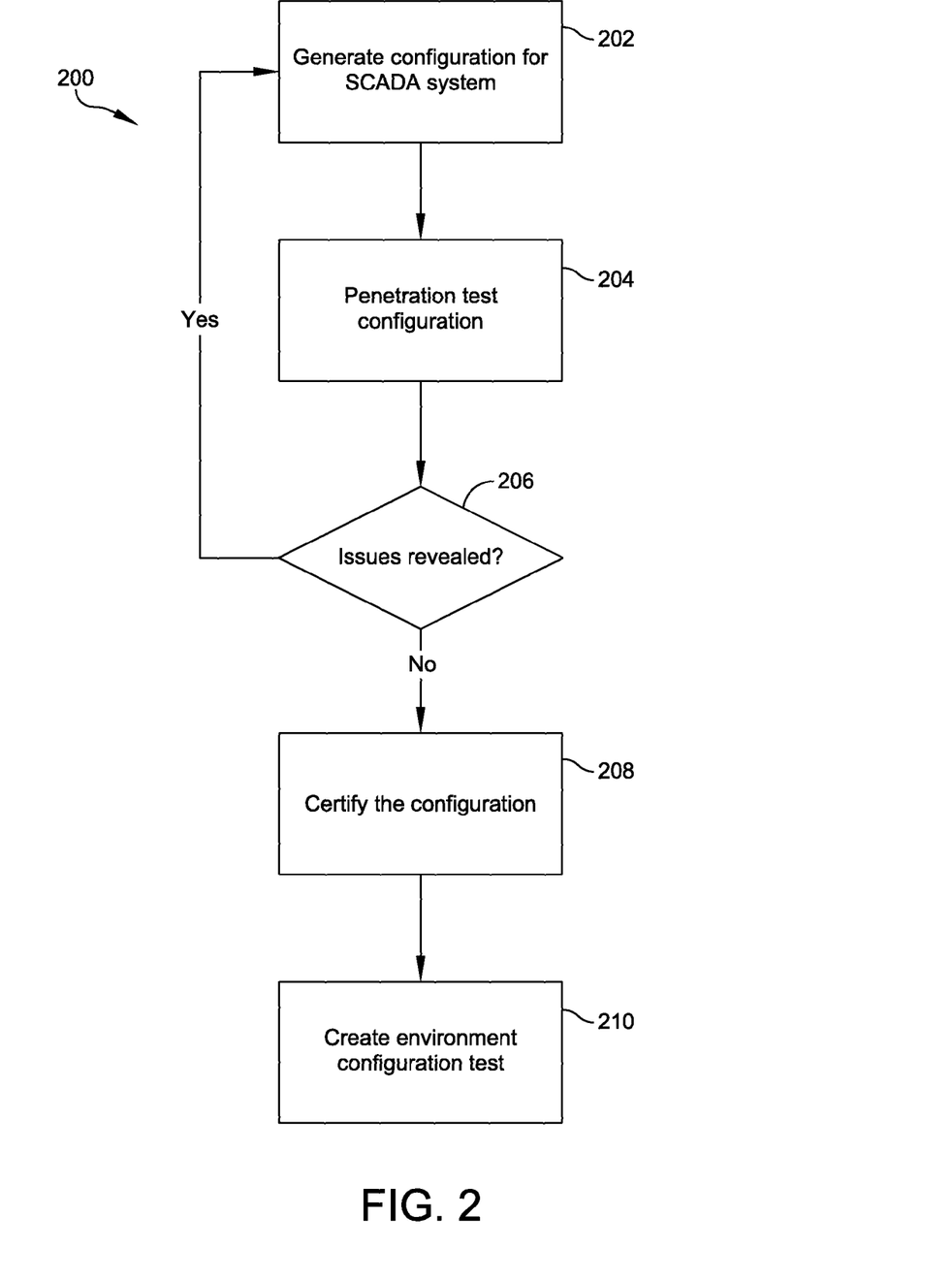
FIG. 2 is a flow chart of an example process according to aspects of some embodiments.

FIG. 2 is an example process 200 for analyzing a SCADA system, such as the SCADA system 100 of FIG. 1. The process 200 starts with generating a configuration for the SCADA system deployed in a first environment (e.g., a default environment or a testing environment) at act 202. The configuration can include values for configurable settings for the devices. The environment can include documentation describing the types of devices in the SCADA system, and the number of devices. The environment can also include operating system versions, update statuses, and firewall rules. The environment can also include external device configurations, such as types of switches, routers, and firewalls connected to the network and configuration settings for some or all of the external devices.

At act 204, the configuration is tested. In some embodiments, the configuration can be tested by the system, for example, by using penetration tests to discover security vulnerabilities in the SCADA system using the configuration in the first environment. Alternatively or additionally, the configuration can be tested by a third party and the results of the test received by the system. For example, a third party can penetration test the configuration to determine whether the configuration can be certified according to a predetermined threshold or a uniform standard. At act 206, the test results are examined for any revealed issues. If any security issues are revealed, the test results can be deemed unsuccessful. In some embodiments, based on an unsuccessful result, the configuration can be modified, to address the discovered security issues, and, returning to act 202, a new configuration can be generated. Acts 202, 204, and 206 can be conducted iteratively, adjusting a configuration until the test results are successful, and no security issues are found. In some embodiments, security issues can be classified in varying degrees of importance. For example, some security issues can be considered warnings, while other security issues can be considered critical. In some embodiments, a successful test can be defined by the user for what level of security issue is acceptable.

At act 208, the configuration can be certified. At act 210, the configuration can be used as a basis of an environment configuration test. For example, an XML file can be generated that details the configuration and the first environment.

Figure 3:
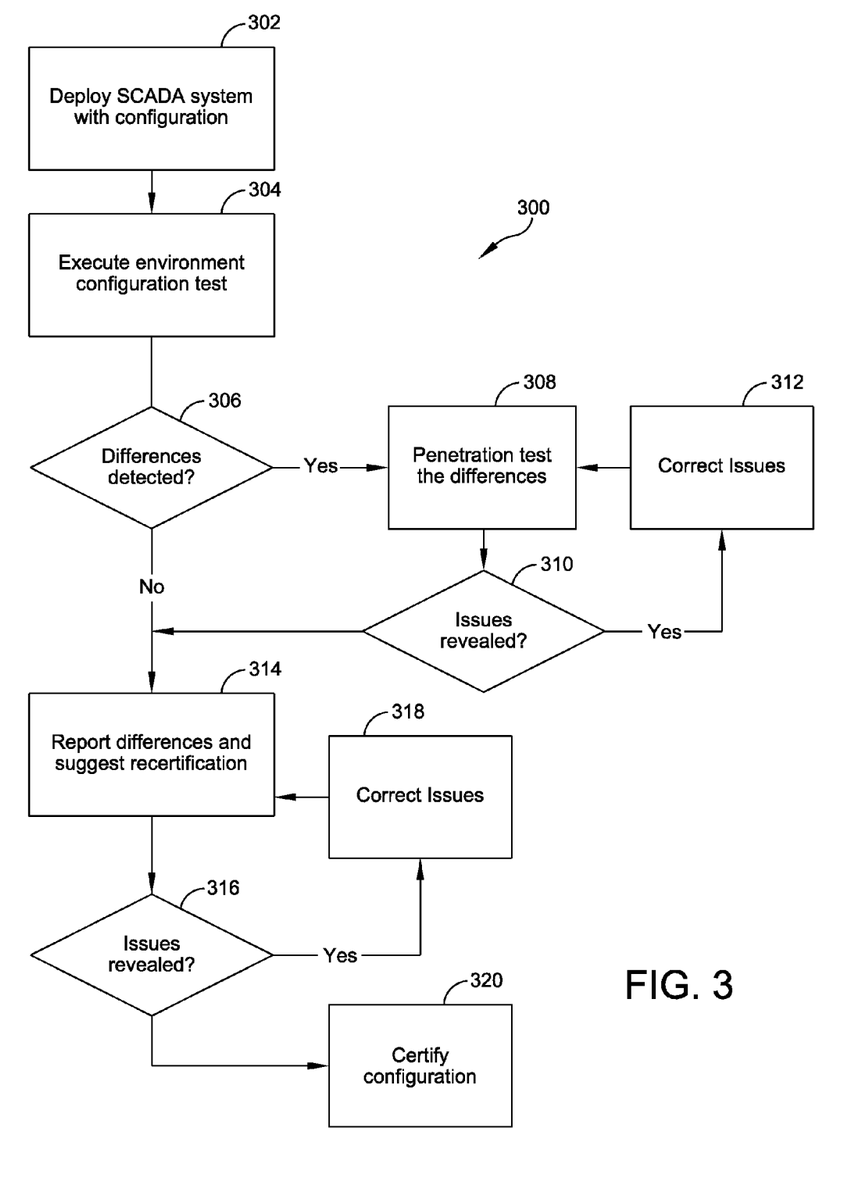
FIG. 3 is a flow chart of an example process according to aspects of some embodiments.

FIG. 3 is an example process 300 for analyzing a SCADA system, such as the SCADA system 100 of FIG. 1. The process 300 starts at act 302 with deploying the SCADA system in a second environment (e.g., a customer environment) using a configuration, such as the configuration generated and certified in example process 200 of FIG. 2. At act

304, an environment configuration test can be executed. In some embodiments, the environment configuration test can be a comparison test of a configuration and first environment (e.g., using an XML file that details the configuration and the first environment) with the configuration and second environment.

At act 306 test results are examined for differences detected between the first environment and the second environment. In some embodiments, if differences are detected, the differences can be used as a basis for further testing. For example, in act 308, the differences and/or the configuration in conjunction with the differences can be penetration tested to determine whether the differences would pose a security issue compared to the configuration in the first environment. In some embodiments, the penetration testing conducted on the differences are the same as the penetration tests conducted on the configuration as a whole. Alternatively or additionally, the testing conducted on the differences can be a subset of the tests conducted on the configuration and/or a different set of tests. In some embodiments, the testing can be conducted by the system. Alternatively or additionally, the testing can be conducted by a third party and the results received by the system.

At act 310, results of the testing of the differences can be examined for security issues. If any security issues are revealed, the test results can be deemed unsuccessful. In some embodiments, based on an unsuccessful result, the configuration and/or the differences in the configuration can be modified at act 312, to address the discovered security issues. Returning to act 308, the differences can be tested again. Acts 308, 310, and 312 can be conducted iteratively, adjusting the configuration and/or the differences in the configuration until the test results are successful, and no security issues are found.

At act 314, the configuration as a whole can be tested in the second environment. In some embodiments, the testing can be a penetration testing, such as the penetration testing used in act 204 of the example process 200. As describe above, the testing can be conducted by the system or by a third part, such as for certification. Alternatively or additionally, a different set of tests can be run in act 314 as compared to those of act 204. At act 316, the test results are examined for any revealed issues. If any security issues are revealed, the test results can be deemed unsuccessful. In some embodiments, based on an unsuccessful result, the configuration can be modified at act 318, to address the discovered security issues. Returning to act 314, the modified configuration can be tested again. Acts 314, 316, and 318 can be conducted iteratively, adjusting a configuration until the test results are successful, and no security issues are found.

At act 320, the adjusted configuration is certified. In some embodiments, the adjusted configuration and the second environment can be used as a basis for a second environment configuration test.

In some embodiments, acts can be carried out independent of other acts or in different orders and/or concurrently from the example order presented.

Figure 4:
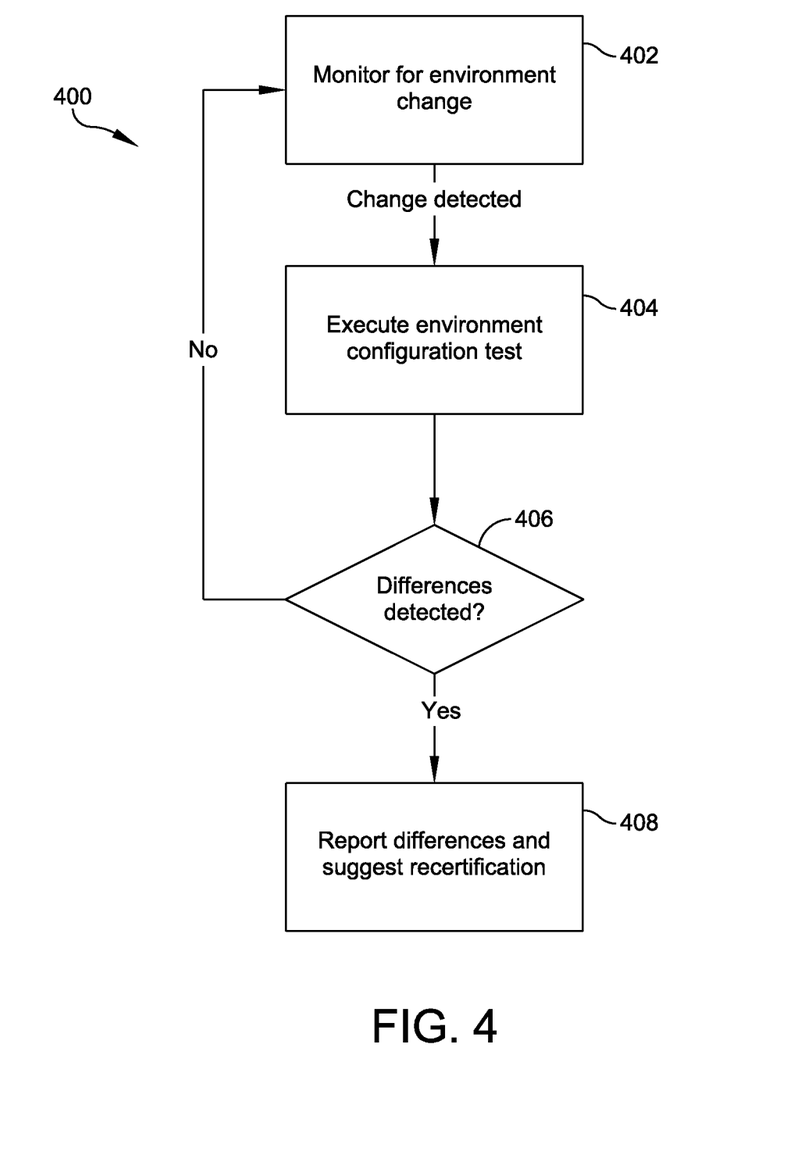
FIG. 4 is a flow chart of an example process according to aspects of some embodiments.

FIG. 4 is an example process 400 for analyzing a SCADA system, such as the SCADA system 100 of FIG. 1. The process 400 starts at act 402, where the system monitors the configuration and the environment in which the SCADA system is deployed. The system can monitor the configuration and the environment for changes to the configuration and the environment. Changes to the environment can include changes to trends in traffic on the network of the SCADA system and power consumption on the servers. If a change in the configuration and/or environment is detected, at act 404, an environment configuration test can be executed. For example, the environment configuration test can be similar to the one executed in act 304 of the example process 300, using an XML file detailing the configuration and the environment to compare to the configuration and the changed environment. The test results can be examined for any differences between the environment and the changed environment at act 406. In some embodiments, the changes in the environment may be considered insignificant with regard to the configuration, and the process can return to act 402 and monitoring the environment for changes.

If a difference is determined, in act 408, the differences can be reported to a user and a recommendation provided on whether the configuration should be recertified. In some embodiments, the recommendation can depend on a number and/or degree of differences in the environment and the changed environment.

Various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 5:
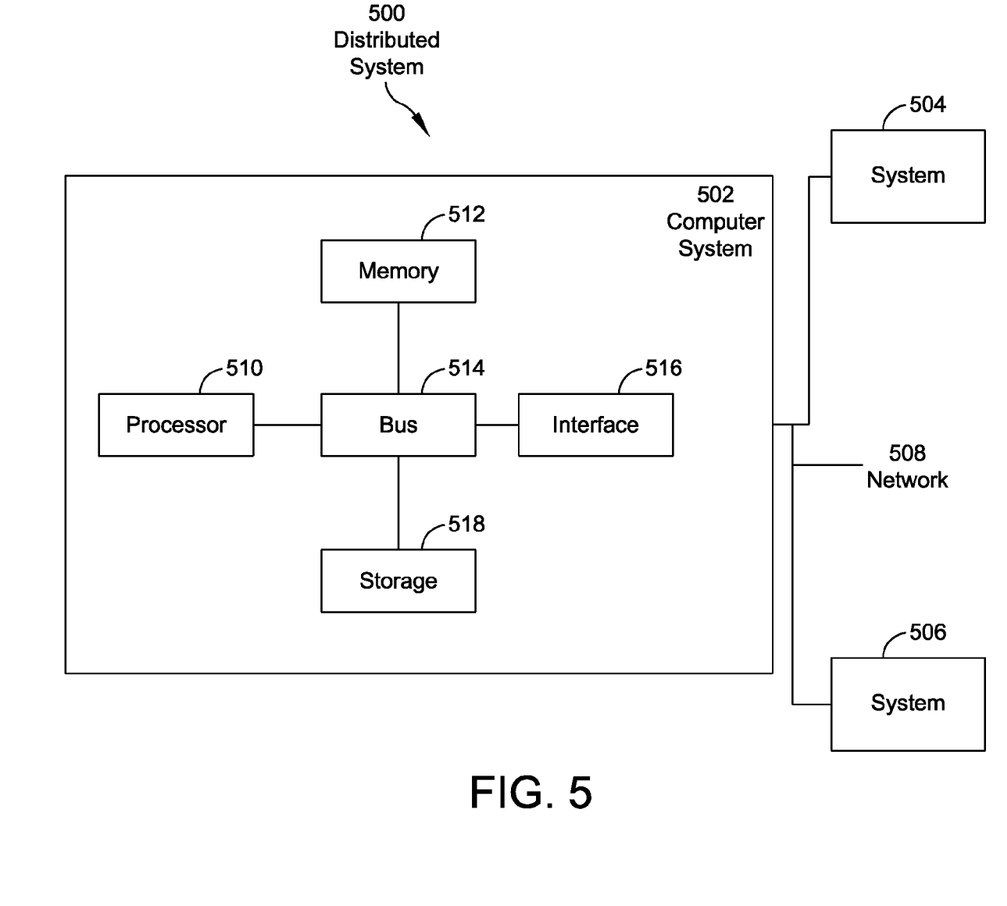
FIG. 5 is a schematic diagram of an example of a computer system that may perform processes and functions disclosed herein.

Referring to FIG. 5, there is illustrated a block diagram of a distributed computer system 500, in which various aspects and functions are practiced. As shown, the distributed computer system 500 includes one more computer systems that exchange information. More specifically, the distributed computer system 500 includes computer systems 502, 504 and 506. As shown, the computer systems 502, 504 and 506 are interconnected by, and may exchange data through, a communication network 508. The network 508 may include any communication network through which computer systems may exchange data. To exchange data using the network 508, the computer systems 502, 504 and 506 and the network 508 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 502, 504 and 506 may transmit data via the network 508 using a variety of security measures including, for example, TLS, SSL or VPN. While the distributed computer system 500 illustrates three networked computer systems, the distributed computer system 500 is not so limited and may include any number of computer systems and computing devices, networked using any medium and communication protocol.

As illustrated in FIG. 5, the computer system 502 includes a processor 510, a memory 512, an interconnection element 514, an interface 516 and data storage 518. To implement at least some of the aspects, functions and processes disclosed herein, the processor 510 performs a series of instructions that result in manipulated data. The processor 510 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 510 is connected to other system components, including one or more memory devices 512, by the interconnection element 514.

The memory 512 stores programs and data during operation of the computer system 502. Thus, the memory 512 may be a relatively high performance, volatile, random access memory such as a dynamic random access memory (DRAM) or static memory (SRAM). However, the memory 512 may include any device for storing data, such as a disk drive or other non-volatile storage device. Various examples may organize the memory 512 into particularized and, in some cases, unique structures to perform the functions disclosed herein. These data structures may be sized and organized to store values for particular data and types of data.

Components of the computer system 502 are coupled by an interconnection element such as the interconnection element 514. The interconnection element 514 may include one or more physical interconnection elements, for example, interconnection elements between components that are integrated within a same machine, but may include any communication coupling between system elements including specialized or standard computing interconnection element technologies such as IDE, SCSI, PCI and InfiniBand. The interconnection element 514 enables communications, such as data and instructions, to be exchanged between system components of the computer system 502.

The computer system 502 also includes one or more interface devices 516 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 502 to exchange information and to communicate with external entities, such as users and other systems.

The data storage 518 includes a computer readable and writeable nonvolatile, or non-transitory, data storage medium in which instructions are stored that define a program or other object that is executed by the processor 510. The data storage 518 also may include information that is recorded, on or in, the medium, and that is processed by the processor 510 during execution of the program. More specifically, the information may be stored in one or more data structures specifically configured to conserve storage space or increase data exchange performance. The instructions may be persistently stored as encoded signals, and the instructions may cause the processor 510 to perform any of the functions described herein. The medium may, for example, be optical disk, magnetic disk or flash memory, among others. In operation, the processor 510 or some other controller causes data to be read from the nonvolatile recording medium into another memory, such as the memory 512, that allows for faster access to the information by the processor 510 than does the storage medium included in the data storage 518. The memory may be located in the data storage 518 or in the memory 512, however, the processor 510 manipulates the data within the memory, and then copies the data to the storage medium associated with the data storage 518 after processing is completed. The processor 510 can also manipulate the data and provide manipulated data to a user on a display and/or a communication interface. A variety of components may manage data movement between the storage medium and other memory elements and examples are not limited to particular data management components. Further, examples are not limited to a particular memory system or data storage system.

Although the computer system 502 is shown by way of example as one type of computer system upon which various aspects and functions may be practiced, aspects and functions are not limited to being implemented on the computer system 502 as shown in FIG. 5. Various aspects and functions may be practiced on one or more computers having a different architectures or components than that shown in FIG. 5. For instance, the computer system 502 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 502 may be a computer system including an operating system that manages at least a portion of the hardware elements included in the computer system 502. In some examples, a processor or controller, such as the processor 510, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 510 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters, such as sponsor types and sectors, and thereby configure the behavior of the components.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for analyzing a supervisory control and data acquisition (SCADA) system including a plurality of devices, the method comprising:
generating a configuration for the SCADA system deployed in a default environment;
receiving a first result of a set of tests run on the SCADA system using the configuration in the default environment;
determining whether the first result of the set of tests is successful;
deploying the SCADA system using the configuration in a customer environment;
comparing the default environment with the customer environment;
determining differences between the default environment and the customer environment;
receiving a result of another set of tests run based on the differences between the default environment and the customer environment;
adjusting the configuration in the customer environment based on the result of the another set of tests to generate an adjusted configuration; and
receiving a second result of the set of tests run on the SCADA system using the adjusted configuration in the customer environment,
wherein adjusting the configuration in the customer environment based on the result of the another set of tests includes at least one of adding a device to the plurality of devices, removing a device from the plurality of devices, and changing a type of a device of the plurality of devices.

2. The method of claim 1, wherein deploying the SCADA system using the configuration in a customer environment is based on a determination that the first result of the set of tests is successful.

3. The method of claim 1, further comprising:
based on a determination that the first result of the set of tests is unsuccessful, modifying the configuration for the SCADA system deployed in the default environment; and
receiving another result of the set of tests run on the SCADA system using the modified configuration in the default environment.

4. The method of claim 1, further comprising:
receiving another result of the another set of tests run based on the adjusted configuration and the differences between the default environment and the customer environment.

5. The method of claim 1, further comprising:
based on the result of the another set of tests, providing a recommended change to the customer environment.

6. The method of claim 1, further comprising monitoring the customer environment for changes to the customer environment, and detecting at least one change in the customer environment.

7. The method of claim 6, further comprising receiving a third result of the set of tests run on the SCADA system using the adjusted configuration and the at least one change in the customer environment.

8. The method of claim 1, wherein receiving the results of the set of tests comprise receiving results of penetration tests on the security vulnerability of the SCADA system.

9. The method of claim 1, wherein generating a configuration for the SCADA system comprises generating a document detailing values of settings for each of the devices in the SCADA system.

10. A system for analyzing a SCADA system including a plurality of devices, the system comprising a processor configured to:
generate a configuration for the SCADA system deployed in a default environment;
receive a first result of a set of tests run on the SCADA system using the configuration in the default environment;
determine whether the first result of the set of tests is successful;
deploy the SCADA system using the configuration in a customer environment;
compare the default environment with the customer environment;
determine differences between the default environment and the customer environment;
receive a result of another set of tests run based on the differences between the default environment and the customer environment;
adjust the configuration in the customer environment based on the result of the another set of tests to generate an adjusted configuration; and
receive a second result of the set of tests run on the SCADA system using the adjusted configuration in the customer environment
wherein adjusting the configuration in the customer environment based on the result of the another set of tests includes at least one of adding a device to the plurality of devices, removing a device from the plurality of devices, and changing a type of a device of the plurality of devices.

11. The system of claim 10, wherein the processor is configured to deploy the SCADA system using the configuration in a customer environment based on a determination that the first result of the set of tests is successful.

12. The system of claim 10, wherein the processor is further configured to:
based on a determination that the first result of the set of tests is unsuccessful, modify the configuration for the SCADA system deployed in the default environment; and
receive another result of the set of tests run on the SCADA system using the modified configuration in the default environment.

13. The system of claim 10, wherein the processor is further configured to:
receive another result of the another set of tests run based on the adjusted configuration and the differences between the default environment and the customer environment.

14. The system of claim 10, wherein the processor is further configured to:
provide a recommended change to the customer environment based on the result of the another set of tests.

15. The system of claim 10, wherein the processor is further configured to:
monitor the customer environment for changes to the customer environment; and
detect at least one change in the customer environment.

16. The system of claim 15, wherein the processor is further configured to receive a third result of the set of tests run on the SCADA system using the adjusted configuration and to at least one change in the customer environment.

17. The system of claim 10, wherein the processor is configured to receive the results of the set of tests by at least receiving results of penetration tests on the security vulnerability of the SCADA system.

18. The system of claim 10, wherein the processor is configured to generate a configuration for the SCADA system by at least generating a document detailing values of settings for each of the devices in the SCADA system.

19. A non-transitory computer readable medium having stored thereon sequences of instruction for analyzing a SCADA system including instructions that will cause at least one processor to:
generate a configuration for the SCADA system deployed in a default environment;
receive a first result of a set of tests run on the SCADA system using the configuration in the default environment;
determine whether the first result of the set of tests is successful;
deploy the SCADA system using the configuration in a customer environment;
compare the default environment with the customer environment;
determine differences between the default environment and the customer environment;
receive a result of another set of tests run based on the differences between the default environment and the customer environment;
adjust the configuration in the customer environment based on the result of the another set of tests to generate an adjusted configuration; and
receive a second result of the set of tests run on the SCADA system using the adjusted configuration in the customer environment,
wherein the SCADA system includes a plurality of devices, and
wherein adjusting the configuration in the customer environment based on the result of the another set of tests includes at least one of adding a device to the plurality of devices, removing a device from the plurality of devices, and changing a type of a device of the plurality of devices.

* * * * *